(12) United States Patent
    Ketcham

(10) Patent No.: US 12,692,018 B2
(45) Date of Patent: Jul. 28, 2026

(54) GENERAL AVIATION PORTABLE ELECTRIC TOWBAR

(71) Applicant: Scott Jonathan Ketcham, Oceanside, CA (US)

(72) Inventor: Scott Jonathan Ketcham, Oceanside, CA (US)

(73) Assignee: Scott Jonathan Ketcham, Oceanside, CA (US)

( * ) Notice: Subject to any disclaimer, the term of this patent is extended or adjusted under 35 U.S.C. 154(b) by 0 days.

(21) Appl. No.: 19/260,443

(22) Filed: Jul. 4, 2025

(65) Prior Publication Data

US 2026/0008564 A1     Jan. 8, 2026

Related U.S. Application Data

(60) Provisional application No. 63/668,220, filed on Jul. 6, 2024.

(51) Int. Cl.
    *B64F 1/223*          (2024.01)
(52) U.S. Cl.
    CPC .................................... *B64F 1/224* (2013.01)
(58) Field of Classification Search
    CPC ...................................................... B64F 1/224
    See application file for complete search history.

(56) References Cited

U.S. PATENT DOCUMENTS

| | | | | | |
|---|---|---|---|---|---|
| 3,713,501 | A | * | 1/1973 | Hurt ........................ | B62B 5/023 180/9.22 |
| 4,280,578 | A | * | 7/1981 | Perkins .................... | A61H 3/04 180/19.3 |
| 4,915,185 | A | * | 4/1990 | Olson .................. | B62D 51/004 180/343 |
| 6,942,180 | B2 | * | 9/2005 | McVaugh ................. | B64F 1/22 244/50 |
| 2010/0006354 | A1 | * | 1/2010 | Kastan .................... | B60S 13/00 180/19.2 |

\* cited by examiner

*Primary Examiner* — Kimberly S Berona
*Assistant Examiner* — Steven J Shur

(57)                ABSTRACT

A general aviation portable electric towbar that uses a frame to couple to the aircraft on one end, has a handle on the other end for the operator to press a drive roller against the wheel to be driven. The chuck of a drill directly mounts to a drive roller shaft without any other method of motion transfer. Since the drill is mounted on the opposite end as the handle, the drill is controlled by a remote trigger mechanism. Since this configuration can use a drill that is commonly available that directly drives a drive roller without any other method of motion transfer, this device has few parts which reduces weight, costs and complexity, making for a simple, reliable, lightweight and affordable portable electric towbar for general aviation use.

12 Claims, 6 Drawing Sheets

GENERAL AVIATION PORTABLE ELECTRIC TOWBAR

CROSS-REFERENCE TO RELATED APPLICATIONS

This application claims benefit of priority with U.S. Provisional Application Ser. No. 63/668,220, filed Jul. 6, 2024; the entire contents of which are hereby incorporated by reference.

BACKGROUND

Field of the Invention

The application relates to a device for towing a general aviation aircraft that is powered by a drill that directly drives a drive roller. The drill is controlled by a remote trigger mechanism. This configuration is simple with few parts which makes it reliable, lightweight, affordable and portable.

Description of the Related Art

While there are other electric battery powered towbars on the market for general aviation light aircraft, few are portable and able to be easily stowed inside the aircraft for use at other airports. The few that are portable are complicated, expensive, large and heavy due to the fact that they use complex mechanisms such as chains, gears, driveshafts to transfer the rotational motion of battery powered electric motors to a drive roller that is pressed against the nosewheel tire of the aircraft for movement as with U.S. Pat. No. 8,235,152B2 Aircraft Moving Device or with US20140262565A1 Portable Wheel Rolling Apparatus.

SUMMARY

This general aviation, portable electric towbar uses a drill that is directly attached to a drive shaft of a drive roller without any other method of motion transfer. There is no use of a more complex mechanism that uses additional chains, gears, belts, or driveshafts to transfer the rotational motion of a drill to the drive roller. Since the drill is mounted near the wheel being driven and not near the handle for the operator, a remote trigger mechanism is used to control the drill from the handle. This configuration increases the reliability with reducing the complexity of parts which reduces the weight and costs, making for a much more simple and affordable portable electric tow bar for general aviation.

BRIEF DESCRIPTION OF THE DRAWINGS

Other features, combinations, and embodiments will be appreciated by one having the ordinary level of skill in the art of towbars upon a thorough review of the following details and descriptions, particularly when reviewed in conjunction with the drawings, wherein.

DETAILED DESCRIPTION

Figure 1:
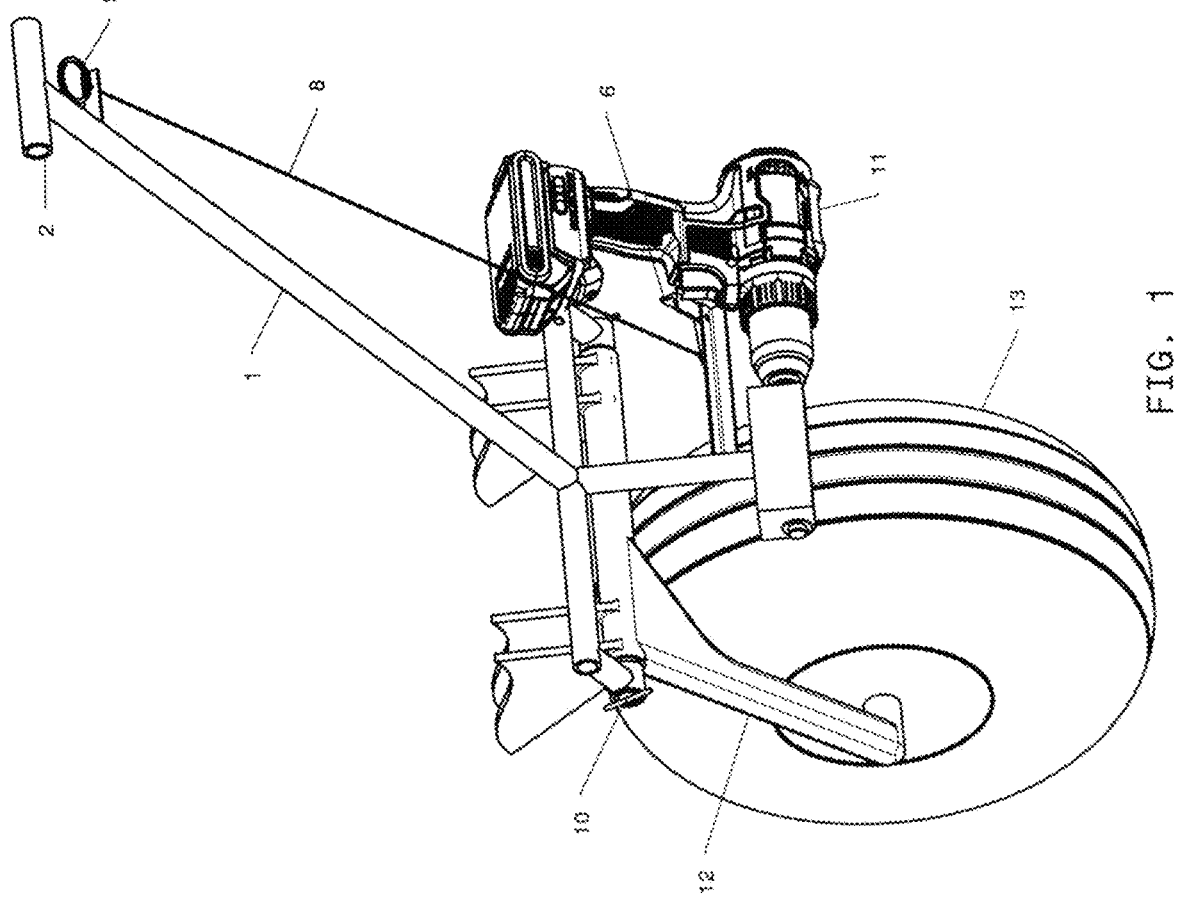
FIG. 1 shows an isometric view of a portable electric towbar attached to a nosewheel structure of a general aviation aircraft in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

The features, components, and configurations described in connection with the various embodiments illustrated herein may be combined, interchanged, or otherwise modified in any number of ways without departing from the scope and spirit of the invention. The embodiments are presented by way of example and not limitation, and it is intended that the invention encompasses all such combinations, permutations, and modifications as would be understood by those skilled in the art.

For purposes herein, the term "drill" denotes any device that has an electric motor with an electrically coupled trigger and drivetrain to drive a chuck for coupling to a variety of rotating tool bits, all integrated into a common housing that also acts as a handle. This drill has a trigger with preferably variable speed control such that towing speeds can be varied and has a reversing function to turn the opposite direction so that the aircraft can be towed backwards or forwards. This drill can be powered with a cord from an electrical outlet, but preferably would be cordless and coupled to a replaceable and rechargeable battery for maximum portability. This drill can be or is similar to many commercially available off-the-shelf units.

The term "directly mounts" denotes that the chuck of the drill attaches directly to the shaft of the drive roller. There is no other method of motion transfer, such as the use of chains, gears, belts or pulleys to transfer the rotational motion of a drill chuck to the drive roller.

The term "remote trigger mechanism" denotes any mechanism used to couple the user to the drill trigger. Since the drill is mounted near the wheel being driven and is at one end of the frame and the user is holding the handle at the other end of the frame, a remote trigger mechanism is used to couple the two together and allow the user to modulate the drill trigger from the handle.

Unless explicitly defined herein, terms are to be construed in accordance with the plain and ordinary meaning as would be appreciated by one having skill in the art.

General Description of Embodiments

While the disclosed technology may have embodiments in many different forms, the example of a specific embodiment herein is described in detail with the understanding that the present disclosure is to be considered as an exemplification of the principles of the technology and is not intended to limit the technology to the embodiments illustrated. The terminology used herein is for the purpose of describing particular embodiments and is not intended to limit the technology. The specific embodiment described herein is use of this technology on a general aviation aircraft with tricycle landing gear. The technology described herein however, can be adapted to be used to move a general aviation taildragger configuration or to drive any wheel on any other device.

This device uses a drill with its chuck directly attached to the shaft of the drive roller without the use of additional gears, chains, sprockets, belts, gear reduction or right angle drive gearboxes or any other motion transfer mechanism between the drive roller and drill. The drill is preferably cordless, variable speed and reversible such that towing speeds can be varied and can be towed backwards or forwards.

The example embodiment described herein, for use on a general aviation tricycle gear aircraft, is a towbar frame that is designed to couple with the aircraft nosewheel structure. The towbar frame can use an adapter, or be adapted to couple with different aircraft makes and models. There are many options for coupling the towbar to the aircraft nose-wheel structure, but the attachment mechanism of the example embodiment described uses sliding pins to couple the aircraft nosewheel structure. This couple allows for the towbar to be used to turn the nosewheel horizontally left and right for steering while the device is driving the nosewheel tire to move the aircraft. This pinned connection is rotatably coupled and allows vertical motion at the handle to apply a force to press the drive roller into the rubber tire of the nosewheel to prevent slipping between the drive roller and nosewheel tire. Other options for coupling the towbar frame to the aircraft include but not limited to, engagement of one or more rods and/or holes to interface to mating features on the aircraft, or use of a threaded or spring loaded clamp.

The drive roller has a surface finish designed to grip the rubber nosewheel tire which can include knurls or teeth cut into the drive roller. The drive roller diameter can be changed to vary the aircraft towing speed and match the torque capacity of the drill that is used. The drive roller is mounted to a shaft on bearings that is supported by the towbar frame.

Since the towing power is supplied by a drill positioned low to the ground at the nosewheel and away from the handle of the towbar, a remote trigger mechanism is used to couple the user to the trigger on the drill. This can be done many different ways, but the specific embodiment detailed herein uses an orthogonal trigger pusher lever that presses against the drill trigger and uses a string or cable to run up to the handle of the towbar to a ring where it can be activated by the operator inserting a finger and pulling on the ring.

The remote trigger mechanism can couple the user to the drill in many different ways. Another configuration from what was described above would be the use of a hand lever to pull a string or bare cable attached to an orthogonal trigger pusher lever to modulate the drill trigger. Yet another option would be the use of a cable inside a housing such that the cable and housing set can run along the frame and does not need to travel in a straight line from the orthogonal trigger pusher to the handle, as a string or bare cable would. Another option would be to use a hydraulic system with a master cylinder actuated at the handle and slave cylinder at the drill to actuator the drill trigger. Another option would be to use an electrical system that uses an electrical actuator that activated the drill trigger.

In some embodiments, the location of the drive roller contact to the nosewheel tire can be placed such that the tangential resultant force vector acts through or near the towbar frame mounting point to the aircraft nosewheel structure. Placing the drive roller contact such that the tangential result force vector acts through or near the towbar mounting point eliminates, or at least drastically reduces, the counter torque needed when driving the nosewheel tire. See FIG. 2 for the example embodiment that shows the tangential resultant force vector F1 acting through the mounting point of the towbar to the nosewheel structure. This eliminates the necessity of another structural component needed to attach the towbar to the nosewheel structure to take the resultant torque. With eliminating the need for an additional structure, this technique further reduces the complexity of the device, improves the reliability, saves weight and the time it takes to attach the towbar to the aircraft.

The operational steps for use of the towbar are as follows: The operator mounts the towbar frame to the nosewheel structure of the aircraft. In the example embodiment, the sliding pins are slid into the aircraft nosewheel structure on both sides. The operator then selects either the forward or reverse function on the drill. The operator then takes hold of the handle of the towbar and applies a vertical downward force which pushes the drive roller into the rubber tire of the nosewheel for a gripping force. The operator then pulls the remote trigger ring to activate the drill. The drill then turns the drive roller which rotates the nosewheel tire and moves the aircraft forward or backwards. The operator can move the towbar handle laterally to steer the aircraft right or left while towing the aircraft.

Although this device is already small and lightweight and designed to be easily stowed in the aircraft for flight and use at any location the aircraft travels to, in some embodiments, the towbar apparatus can include other features to further be compact so that the tow apparatus can be stowed in an even tighter location of the aircraft such as under a seat, or in any suitable compartment within an aircraft. These features can include a folding or telescoping frame to reduce the overall length of the towbar. Additionally, quick release spring pins can be used to allow quick engagement and dis-engagement of the telescoping or folding frame to secure and lock the frame quickly into both a folded and opened position.

The components of the towbar can be made from any suitable materials including steel, aluminum and titanium. Basic steel, although heavier, can be used to reduce costs, while lighter weight materials can be used to reduce weight such as aluminum or titanium, but at higher manufacturing costs. Additionally, although not illustrated, the components comprising any embodiments of the towbar can be modified or configured to accommodate different nosewheel or tail-wheel assemblies of a variety of aircraft.

Construction of the device can be done many different ways, but the example shown is with metallic tubes that are welded together to form the frame that connects the handle on one end to the other end that couples to the aircraft nosewheel structure and connects with the drive roller section. For the example embodiment, sliding pins are utilized to allow the device to straddle the hollow tube in the example aircraft nosewheel structure, allowing the pins to slide into the hollow tube to couple the towbar frame to the nosewheel structure. Short tubes are welded to the frame and their inside diameters are chosen with clearance to allow the sliding pins to slide freely inside of them. The frame portion that houses and supports the drive roller can be made from right-angle metal with plates welded to each end. These end plates have holes cut into them that flanged ball bearings are pressed into. A shaft is then placed into the bearings. Over this shaft is a drive roller that has a gripping feature that will interface to the rubber tire of the nosewheel without slipping. These non-slip features could be a knurled surface, or in the example device, the roller has ridges cut into the surface. The drive roller shaft protrudes on one end for attaching the chuck of the drill. A smaller metallic part of the frame is welded (or attached in a way to be adjustable) to provide a mount for the trigger pusher for the drill. The trigger pusher can be made to form a right-angle with a string or cable attached so that when the string or cable is pulled, the motion pushes the other end of the right-angled trigger pusher against the drill trigger. Material choice and construction techniques can be chosen to minimize weight for ease of handling and to reduce cargo weight since this device is intended to be kept with the aircraft during flight for convenience and case of use at any airport destination.

The diameter of the drive roller can be changed to account for the drill operational rpm and torque to match the necessary towing speed of the aircraft or the incline of the ground. A smaller drive roller diameter will produce slower towing speeds but additional torque for heavier aircraft or the necessity of towing the aircraft up an incline. Conversely, a larger diameter drive roller will increase the towing speed of an aircraft, but will have less available torque necessary to tow heavier aircraft, or towing up an incline.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

First Illustrated Embodiment

Now turning to the drawings, FIG. 1 through FIG. 6 are multiple views of an embodiment of the portable electric towbar, both as its own entity and also how it couples to a nosewheel tire 13 of a general aviation aircraft. The frame 1 connects the handle 2 to the sliding pins 10 that engage to the aircraft nosewheel structure 12 and the drive roller 5 that is pressed against the nosewheel tire 13 of the aircraft. A chuck of the drill 11 is attached directly to the drive shaft 4 and the frame 1 mounts a remote trigger mechanism that allows the user to control the speed of the drill 11 from the handle 2. The remote trigger mechanism couples an orthogonal trigger pusher 6 that is actuated by the trigger string 8 that travels up to the handle 2 to be pulled on by the user to control the speed of the drill 11 and, hence, control the towing speed of the aircraft.

Figure 2:
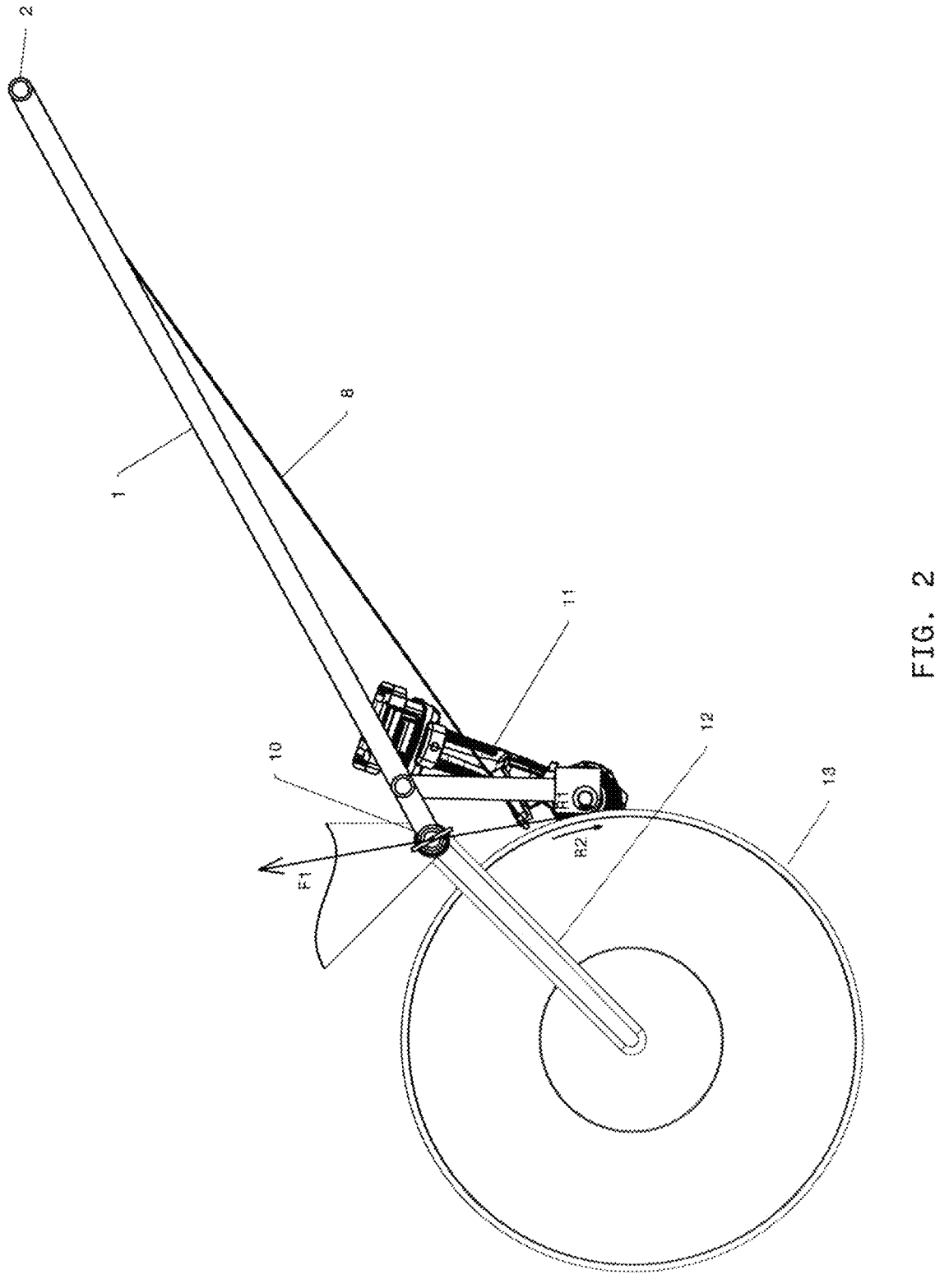
FIG. 2 shows a side view of the portable electric towbar attached to a general aviation aircraft and demonstrates how it interfaces with the aircraft for its use in towing according to the first illustrated embodiment.

The sliding pins 10 are used to engage the towbar to the nosewheel structure 12. This allows the towbar frame 1 to be rotatably coupled up and down so that downward pressure can be applied to the handle 2 to press the drive roller 5 into the nosewheel tire 13. The sliding pins 10 engagement also allow the handle 2 to be moved side to side to control the direction of the nosewheel tire 13 and subsequent towing direction of the aircraft. Once the appropriate pressure is applied to the drive roller 5, the operator will pull on the trigger ring 9 that is attached to the trigger string 8 to activate the orthogonal trigger pusher 6 for the drill 11 to start the rotation of the drive roller 5 which rotates the nosewheel tire 13 and starts the movement of the aircraft. FIG. 2 shows the counterclockwise rotation direction R1 of the drive roller 5 and subsequent clockwise rotation R2 of the aircraft nosewheel tire 13. The position of contact of the drive roller 5 to the nosewheel tire 13 is positioned in such a way that the tangential reaction force vector F1 acts through the towbar frame 1 attachment point of the sliding pins 10 to the aircraft. This drastically reduces or even eliminates the reaction torque of the drill 11 onto the towbar frame 1 so the operator does not have to apply a counter-force at the handle 2.

Figure 3:
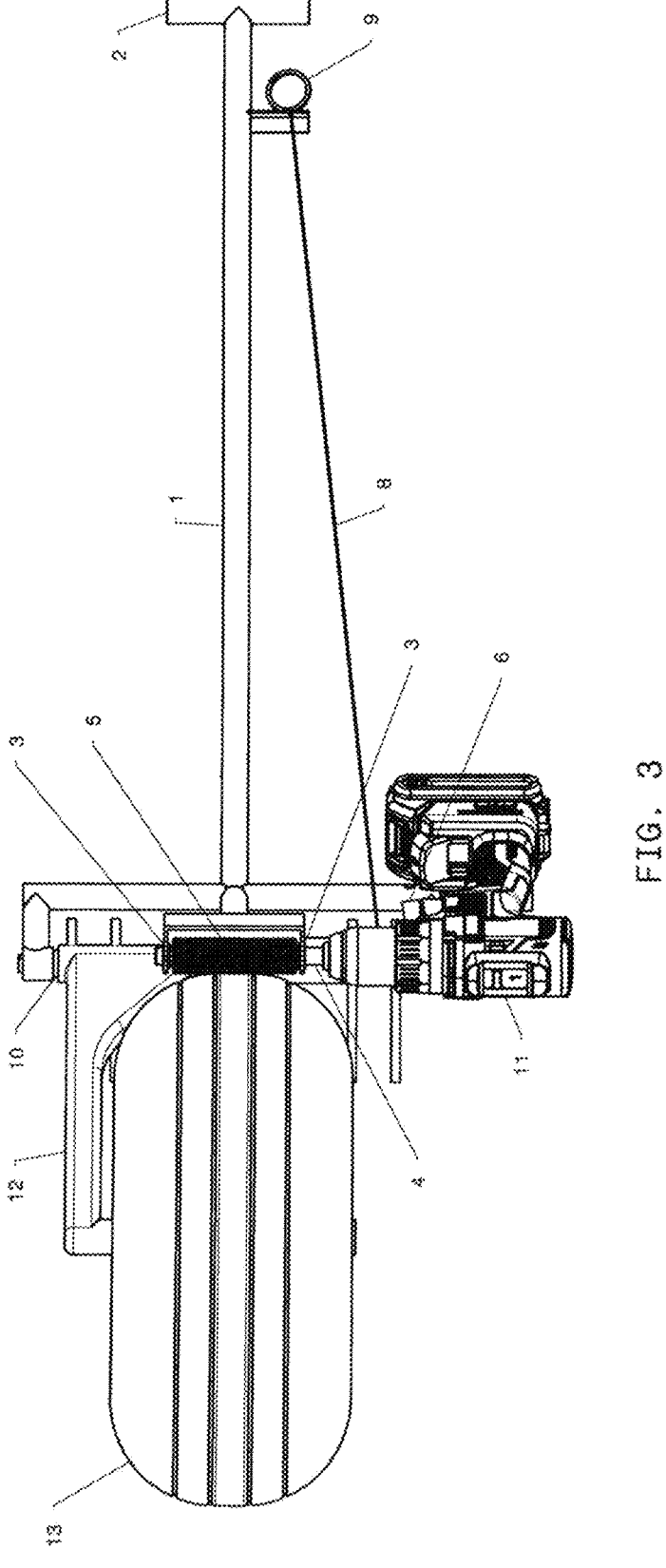
FIG. 3 shows a bottom angled view of the device attached to an aircraft looking normal to the interface of the drive roller pressed into the aircraft nosewheel tire according to the first illustrated embodiment.

The interface of the drive roller 5 pressed into the aircraft nosewheel tire 13 is most clearly seen looking upward as shown in FIG. 3. This is a clear illustration of the simple direct-drive configuration with the drill 11 that directly mounts to the drive shaft 4 and drive roller 5 without any additional motion transfer components that would add weight, complexity and cost of the towbar apparatus.

Figure 4:
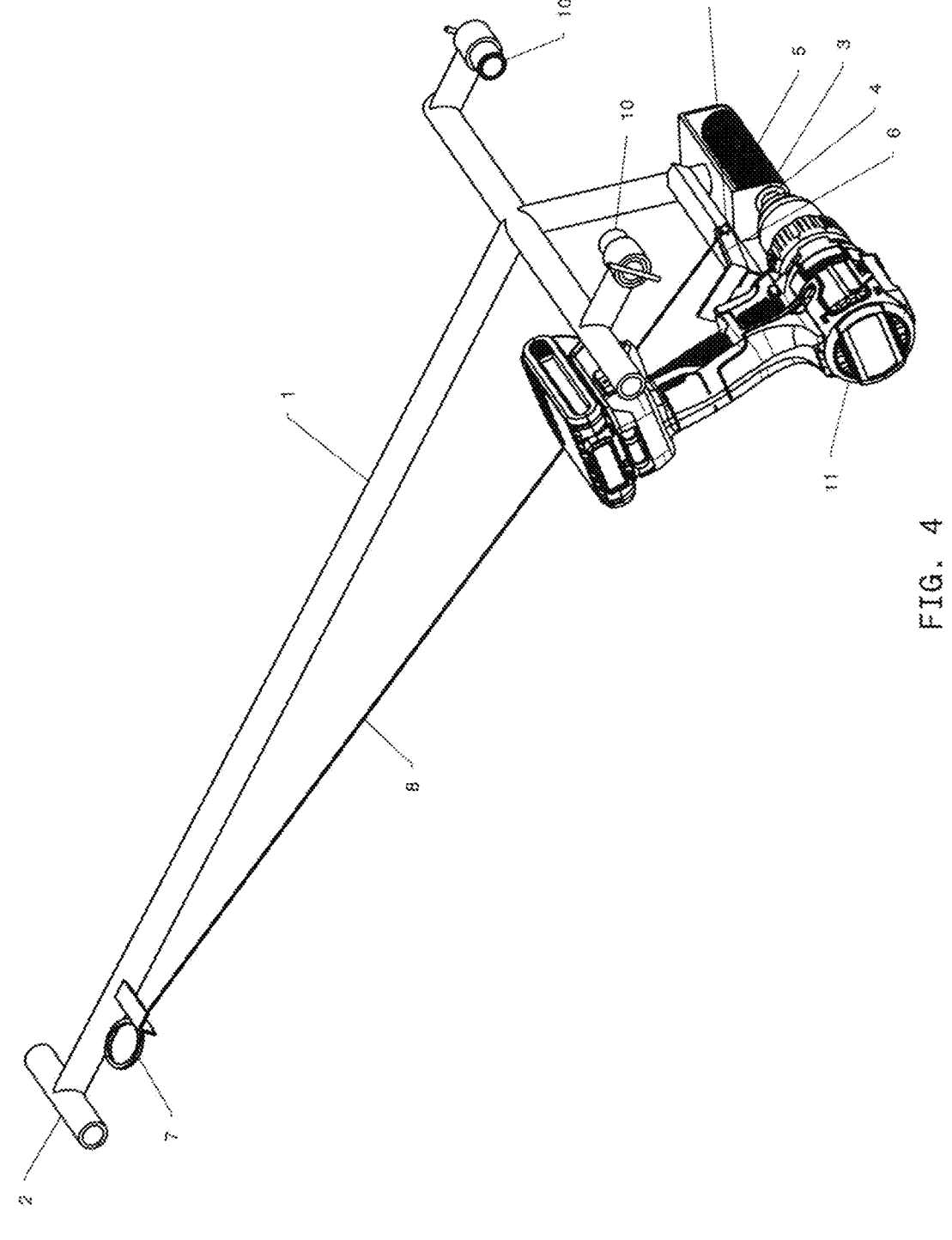
FIG. 4 shows an isometric view of the towbar apparatus itself without the aircraft coupled for clarification of just the apparatus itself according to the first illustrated embodiment.
Figure 5:
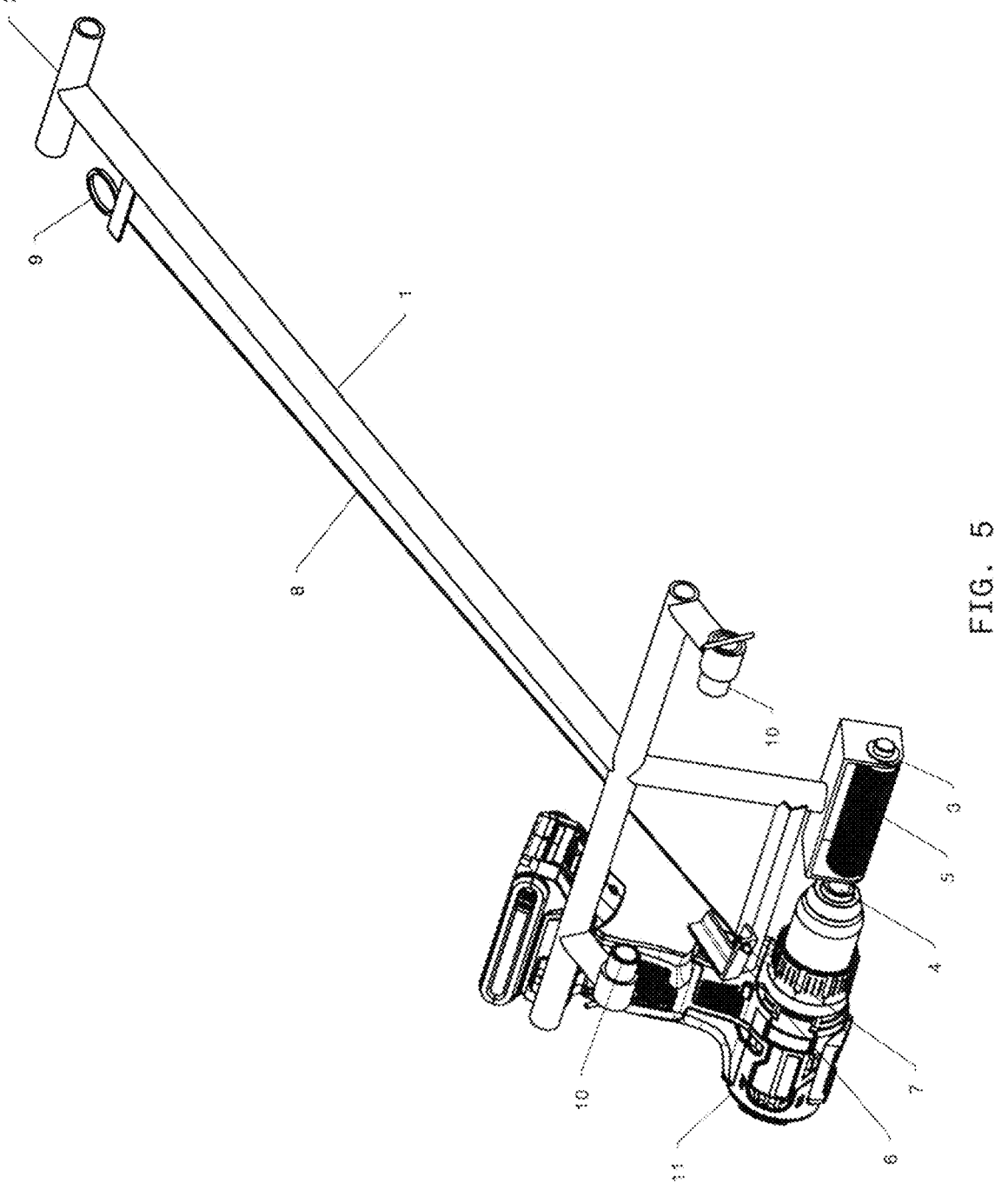
FIG. 5 shows another isometric view of the towbar apparatus itself without the aircraft coupled and is from the opposite side as FIG. 4 according to the first illustrated embodiment.
Figure 6:
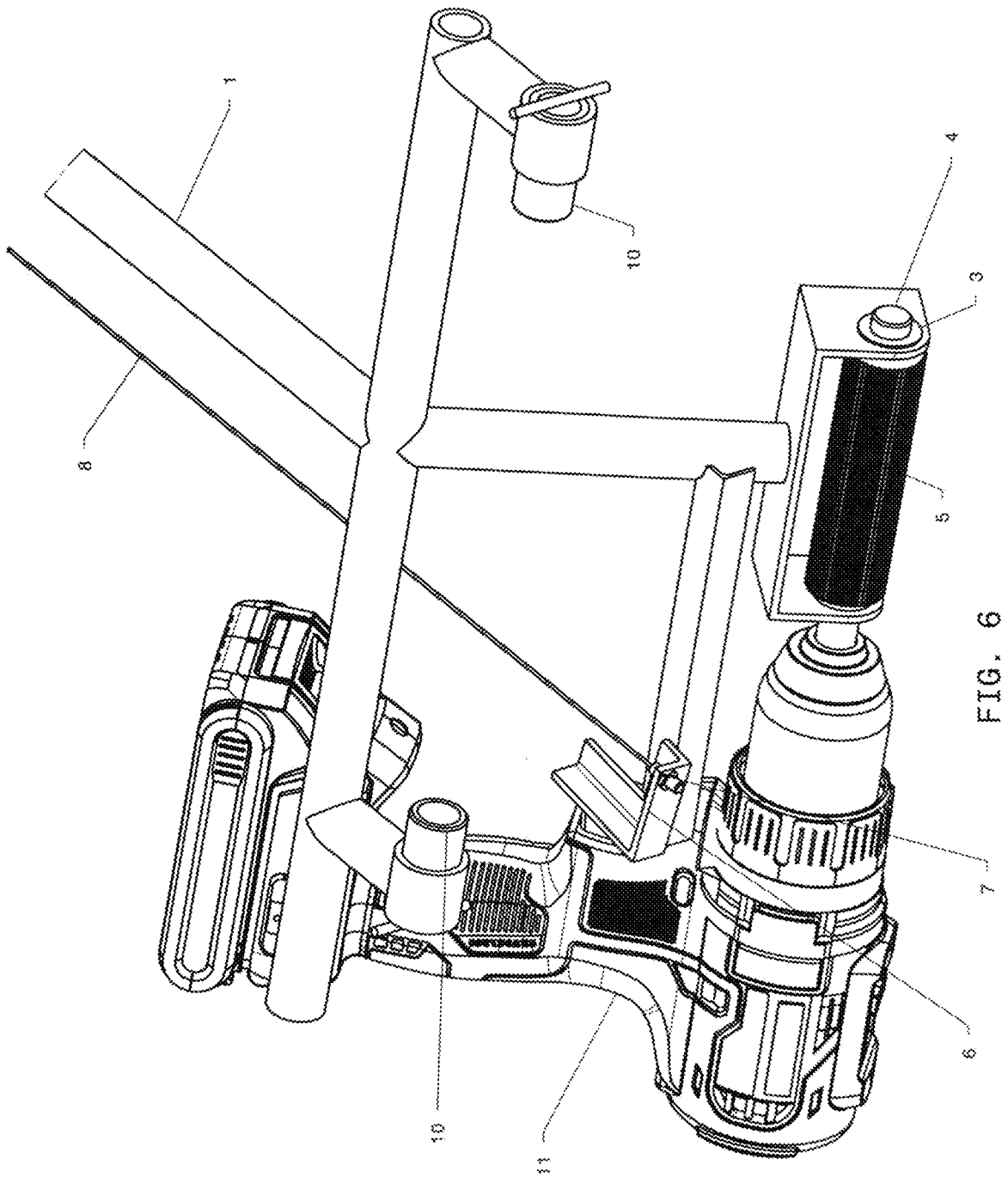
FIG. 6 shows a closer view of the towbar apparatus of the end that couples to the aircraft according to the first illustrated embodiment.

The towbar apparatus as its own entity, without an interfacing aircraft, is seen in FIG. 4. Clearly illustrated is the towbar frame 1 with the handle 2 and support for bearings 3 on either side of the drive shaft 4. A drive roller 5 is mounted to the drive shaft 4 and has the gripping features to interface with the aircraft nosewheel tire 13 without slipping. The chuck of a drill 11 is tightened onto the drive shaft 4 and then the body of the drill 11 is rotationally secured to the frame 1 with a ziptie, or any other method, to prevent the body of the drill 11 from rotating about the drive shaft 4. This allows the drill 11 to impart its torque to the drive roller 5 without spinning relative to the towbar frame 1. An orthogonal trigger pusher 6 is mounted to and rotatably coupled to the frame 1 such that one end presses on the trigger of drill 11. The other end of the trigger pusher 6 is connected to the trigger string 8 and can use a threaded adjuster 7 to adjust the tension of the trigger string 8. Attached to the other end of the trigger string 8 near the handle 2, is a trigger ring 9 that the operator puts a finger through to pull to activate the trigger pusher 6 for the drill 11. The amount of movement in this trigger ring 9 varies the drill 11 speed and hence the towing speed of the aircraft.

In the example embodiment shown, sliding pins 10 are used to connect the towbar frame 1 to the nosewheel structure 12. These sliding pins 10 are slid outwards while the frame 1 is placed over and straddles the nosewheel structure 12 and then the sliding pins 10 are slid inwards into the hollow tube of the example nosewheel structure 12 to couple the towbar to the aircraft.

While the above detailed description has described novel features as applied to various embodiments, it will be understood that various omissions, substitutions, and changes in the form and details of the device illustrated can be made without departing from the spirit of the disclosure. Additionally, the various features described above can be combined in a variety of ways and all possible combinations and subcombinations are intended to fall within the scope of this disclosure.

As will be recognized, certain embodiments described herein can be embodied within a form that does not provide all of the features and benefits set forth herein, as some features can be used or practiced separately from others. The scope of the invention is indicated by the appended claims rather than by the foregoing description. All changes which come within the meaning and range of equivalency of the claims are to be embraced within their scope.

FEATURE LIST

Frame (1)
Handle (2)
Bearing (3)
Drive Shaft (4)
Drive Roller (5)
Trigger Pusher (6)
Threaded Adjuster (7)
Trigger String (8)
Trigger Ring (9)
Sliding Pin (10)
Drill (11)
Nosewheel Structure (12)
Nosewheel Tire (13)

What is claimed is:

1. A general aviation portable electric towbar apparatus for moving an aircraft, comprising:
    a frame having an attachment mechanism configured to detachably couple to an aircraft wheel, the frame configured to allow lateral movement to control the direction of tow and vertical movement to apply a force for pressing a drive roller into the wheel being driven;
    a drive roller supported by the frame that is configured to push against the wheel being driven, the drive roller having an axis of rotation parallel to that of an axis of rotation of the wheel being driven;
    a drill with a chuck and a drill trigger, the chuck that mounts directly to a shaft of the drive roller without any other method of motion transfer between the two;
    a handle coupled to the frame such that the handle is used to apply a vertical force to press the drive roller into the wheel being driven and a lateral force to move the wheel from side to side for steering; and
    a remote trigger mechanism configured to activate the drill trigger from the handle end of the frame.

2. The towbar apparatus of claim 1, wherein the location of contact of the drive roller to the wheel being driven is such that a resultant tangential force vector acts through or near the mounting point of the towbar to reduce a torque reaction that the drill generates onto the handle, thereby reducing an opposite force needed.

3. The towbar apparatus of claim 1, wherein an additional structural member is attached between the towbar and aircraft to react the torque from the drill.

4. The towbar apparatus of claim 1, wherein the remote trigger mechanism comprises an orthogonal trigger pusher that is rotatably coupled on the frame with one end pressing against the drill trigger and the other end connected to a string or cable that runs up to the handle to a ring that can be pulled to activate the drill trigger.

5. The towbar apparatus of claim 1, wherein the remote trigger mechanism comprises a cable that runs through a housing to apply a force on the drill trigger.

6. The towbar apparatus of claim 1, wherein the remote trigger mechanism is a hydraulic system with a master cylinder actuated at the handle and slave cylinder at the drill to actuator the drill trigger.

7. The towbar apparatus of claim 1, wherein the remote trigger mechanism is configured with an electric actuator to apply the force on the drill trigger.

8. The towbar apparatus of claim 1, wherein the remote trigger mechanism is activated by a lever at the handle to apply the force on the drill trigger.

9. The towbar apparatus of claim 1, wherein the frame is collapsible and folds or telescopes to save storage space with spring loaded pins for quick release and locking.

10. The towbar apparatus of claim 1, wherein the attachment mechanism of the frame to couple to the aircraft comprises sliding pins to engage the towbar frame to the aircraft.

11. The towbar apparatus of claim 1, wherein the attachment mechanism of the frame to couple to the aircraft comprises an engagement of one or more rods and/or holes to interface to mating features of the aircraft.

12. The towbar apparatus of claim 1, wherein the attachment mechanism of the frame to couple to the aircraft is a clamp that is either threaded or spring loaded.

* * * * *